(12) United States Patent
Yoshihara et al.

(10) Patent No.: US 9,376,137 B2
(45) Date of Patent: Jun. 28, 2016

(54) STEERING DEVICE

(71) Applicants: JTEKT CORPORATION, Osaka-shi, Osaka (JP); TOYOTA JIDOSHA KABUSHIKI KAISHA, Toyota-shi, Aichi-ken (JP); FUJI KIKO Co., Ltd., Kosai-shi, Shizuoka (JP)

(72) Inventors: Yoshihito Yoshihara, Kashihara (JP); Tomonori Sugiura, Yamatokoriyama (JP); Yuji Takahashi, Obu (JP); Atsumune Nagatani, Kashihara (JP); Tatsuro Kubota, Shiki-gun (JP); Shigeru Hoshino, Toyota (JP); Yota Uesaka, Toyohashi (JP)

(73) Assignees: JTEKT CORPORATION, Osaka-shi (JP); Toyota Jidosha Kabushiki Kaisha, Toyota (JP); Fuji Kiko Co., Ltd., Kosai-shi (JP)

( * ) Notice: Subject to any disclaimer, the term of this patent is extended or adjusted under 35 U.S.C. 154(b) by 0 days.

(21) Appl. No.: 14/665,691

(22) Filed: Mar. 23, 2015

(65) Prior Publication Data
US 2015/0266496 A1 Sep. 24, 2015

(30) Foreign Application Priority Data
Mar. 24, 2014 (JP) .................................. 2014-060936

(51) Int. Cl.
*B62D 1/184* (2006.01)
*B62D 1/185* (2006.01)
*B62D 1/19* (2006.01)

(52) U.S. Cl.
CPC ................ *B62D 1/184* (2013.01); *B62D 1/185* (2013.01); *B62D 1/195* (2013.01)

(58) Field of Classification Search
CPC ......... B62D 1/184; B62D 1/195; B62D 1/185
See application file for complete search history.

(56) References Cited

U.S. PATENT DOCUMENTS

| | | | | |
|---|---|---|---|---|
| 5,009,120 A | * | 4/1991 | Iseler | B62D 1/184 280/775 |
| 2010/0282016 A1 | * | 11/2010 | Oehri | B62D 1/195 74/493 |
| 2011/0115206 A1 | * | 5/2011 | Sulser | B62D 1/195 280/775 |

(Continued)

FOREIGN PATENT DOCUMENTS

| | | |
|---|---|---|
| FR | 2840869 A1 | 12/2003 |
| JP | 2002-059849 A | 2/2002 |
| WO | 2012/000593 A1 | 1/2012 |

OTHER PUBLICATIONS

Sep. 7, 2015 Search Report issued in European Application No. 15160369.3.

*Primary Examiner* — Faye M Fleming
(74) *Attorney, Agent, or Firm* — Oliff PLC (57) ABSTRACT

A steering device includes: a steering shaft and a column jacket that are telescopically adjustable in an axial direction; a lock plate provided with a plurality of holes; a lock mechanism that moves a tooth such that the tooth advances to the lock plate to be engaged with one of the holes, and retreats from the lock plate to be disengaged from the hole. The lock plate includes a bent portion as a stopper at an end portion of the lock plate in the axial direction, and the stopper restricts a movement of an upper jacket relative to a lower jacket in the axial direction by abutting on the lock mechanism in the axial direction when the steering shaft and the column jacket is telescopically adjusted.

7 Claims, 7 Drawing Sheets

(56) References Cited

U.S. PATENT DOCUMENTS

| | | | | |
|---|---|---|---|---|
| 2012/0266716 A1* | 10/2012 | Sulser | ................... | B62D 1/184 74/493 |
| 2013/0118292 A1 | 5/2013 | Sulser et al. | | |
| 2015/0239490 A1* | 8/2015 | Sakata | ................... | B62D 1/192 74/493 |
| 2015/0266495 A1* | 9/2015 | Yoshihara | .............. | B62D 1/195 74/493 |
| 2015/0266497 A1* | 9/2015 | Yoshihara | .............. | B62D 1/184 74/493 |
| 2015/0266499 A1* | 9/2015 | Yoshihara | .............. | B62D 1/195 74/493 |

\* cited by examiner

STEERING DEVICE

INCORPORATION BY REFERENCE

The disclosure of Japanese Patent Application No. 2014-060936 filed on Mar. 24, 2014 including the specification, drawings and abstract is incorporated herein by reference in its entirety.

BACKGROUND OF THE INVENTION

1. Field of the Invention

The invention relates to a steering device.

2. Description of Related Art

In a steering device for a vehicle described in Japanese Patent Application Publication No. 2002-59849 (JP 2002-59849 A), a steering column rotatably supports a steering shaft that supports a steering wheel. The steering column is constituted by an inner column on an upper side and an outer column on a lower side that is fitted to the inner column. The position of the steering wheel in an axial direction is adjusted by telescopic sliding that slides the inner column relative to the outer column in the axial direction.

A substantially U-shaped holder is provided in the outer column. A tubular stopper protrusion is formed on the holder by burring. The stopper protrusion is engaged with an axially elongated hole in the inner column.

During the telescopic sliding, the stopper protrusion can move in the axially elongated hole of the inner column. The stopper protrusion functions as a stopper for the inner column in the axial direction by abutting on the end portion of the axially elongated hole.

In the steering device disclosed in JP 2002-59849 A, the stopper protrusion of the holder and the axially elongated hole of the inner column are provided only for restricting the telescopic sliding. With this, the step of forming the stopper protrusion on the holder and the step of forming the axially elongated hole in the inner column are required in the assembly of the steering device, and hence there is a possibility that the number of assembly steps is increased and an assembly cost is increased.

SUMMARY OF THE INVENTION

The invention provides the steering device capable of achieving a reduction in the number of assembly steps.

An aspect of the invention is a steering device including: a steering shaft including a first end to which a steering member is mounted and second end, wherein the steering shaft is telescopically adjustable in an axial direction of the steering shaft; a column jacket rotatably supporting the steering shaft and including an upper jacket positioned on a first end side and a lower jacket positioned on a second end side, wherein the column jacket is telescopically adjustable with movement of the upper jacket relative to the lower jacket in the axial direction; a lock plate fixed to the upper jacket and provided with a plurality of holes arranged in the axial direction; and a lock mechanism supported by the lower jacket and including a tooth that advances to and retreats from the lock plate. The lock mechanism moves the tooth such that the tooth advances to the lock plate to be engaged with one of the holes, and retreats from the lock plate to be disengaged from the one of the holes. The lock plate includes a bent portion as a stopper at an end portion of the lock plate in the axial direction, and the stopper restricts the movement of the upper jacket relative to the lower jacket in the axial direction by abutting on the lock mechanism in the axial direction when the steering shaft and the column jacket is telescopically adjusted.

According to the above configuration, in the steering device, when the tooth of the lock mechanism is engaged with any of the holes in the lock plate fixed to the upper jacket, it is possible to stop extension and contraction of the steering shaft and the column jacket and lock the position of the steering member in the axial direction. On the other hand, when the tooth retreats to be disengaged from the hole, it is possible to cause the steering shaft and the column jacket to extend or contract and adjust the position of the steering member in the axial direction.

The stopper provided in the lock plate restricts the movement of the upper jacket relative to the lower jacket in the axial direction by abutting on the lock mechanism in the axial direction when the steering shaft and the column jacket is telescopically adjusted.

The stopper is formed by bending the end portion of the lock plate in the axial direction, and hence it is possible to form the stopper as a part of the lock plate simultaneously in the step of forming the lock plate. That is, it is not necessary to provide the stopper as an independent component, and it is not necessary to provide a new step for forming the stopper in the assembly of the steering device. Consequently, it is possible to achieve a reduction in the number of assembly steps.

The stopper may be bent toward the lock mechanism.

The stopper may include a first stopper provided at an end portion of the lock plate in the axial direction on the first end side.

An end portion of the tooth on an upper side may be positioned on the upper side of an end portion of the first stopper on a lower side in a state in which the tooth retreats from the lock plate to a lower side of the lock plate.

According to the above configuration, since the first stopper is provided at the end portion in the axial direction on the first end side, when the upper jacket is moved relative to the lower jacket to the second end side, the stopper abuts on the lock mechanism from the first end side. With this, it is possible to restrict the movement of the upper jacket relative to the lower jacket to the first end side.

The stopper may include a second stopper provided at an end portion of the lock plate in the axial direction on the second end side.

An end portion of the second stopper on an lower side may be positioned on the lower side of an end portion of the lock mechanism on the second end side in a state in which the tooth retreats from the lock plate to the lower side of the lock plate.

According to the above configuration, the second stopper is provided at the end portion in the axial direction on the second end side. Accordingly, when the upper jacket is moved relative to the lower jacket to the first end side, the stopper abuts on the lock mechanism from the second end side. With this, when the steering shaft and the column jacket extend or contract, it is possible to restrict the upper jacket from being detached from the lower jacket to the first end side unexpectedly.

The lower jacket may be a tubular body provided with a slit that extends in the axial direction and accommodates the lock mechanism, the upper jacket may be accommodated in the lower jacket, and the stopper may be fitted in the slit.

According to the above configuration, the upper jacket is accommodated in the lower jacket as the tubular body formed with the slit that extends in the axial direction and accommodates the lock mechanism. The stopper fixed to the upper jacket is fitted in the slit of the lower jacket and functions as a rotation stopper, and hence it is possible to prevent unexpected relative rotation between the upper jacket and the lower jacket.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinbelow, an embodiment of the invention will be described in detail with reference to the accompanying drawings.

Figure 1:
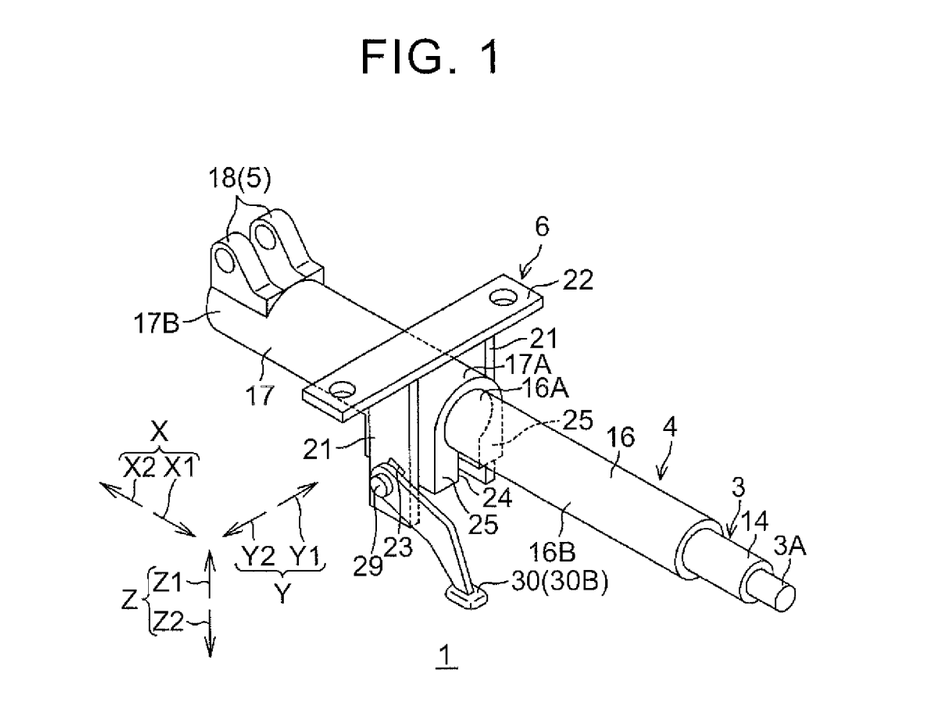
FIG. 1 is a schematic perspective view of a steering device 1 according to an embodiment of the invention.
Figure 2:
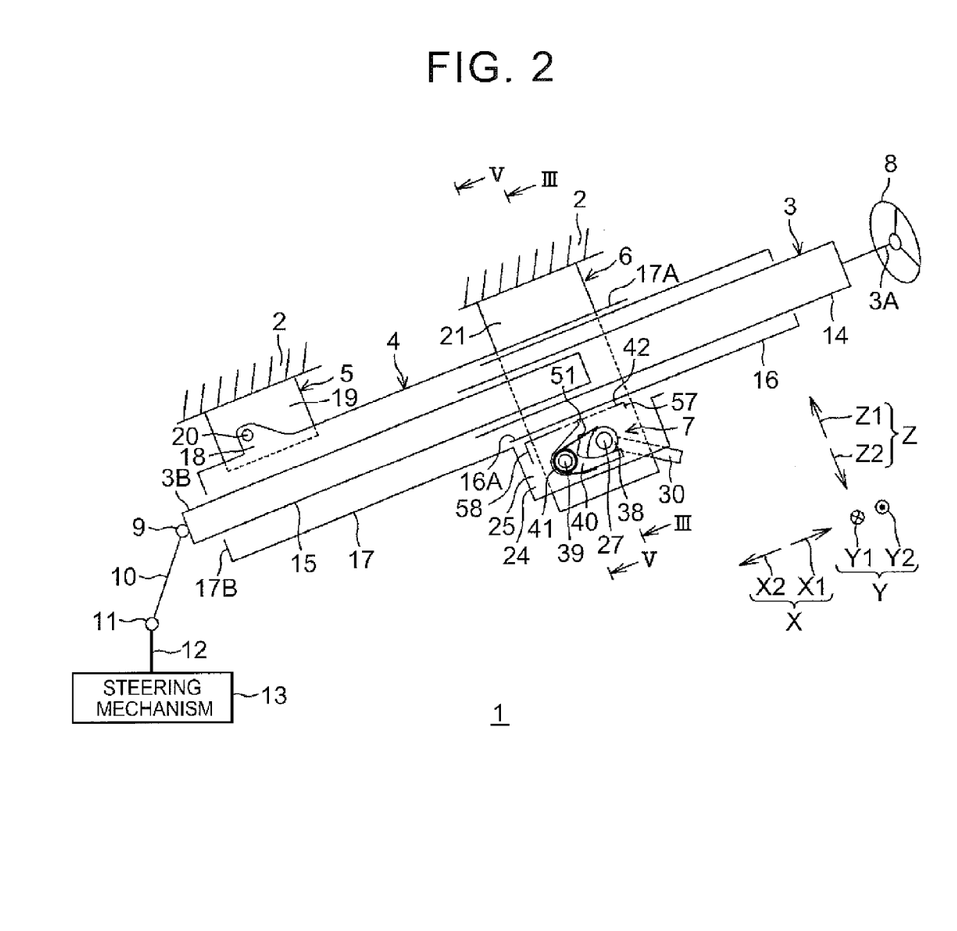
FIG. 2 is a schematic side view showing the schematic configuration of the steering device 1.

FIG. 1 is a schematic perspective view of a steering device 1 according to an embodiment of the invention. FIG. 2 is a schematic side view showing the schematic configuration of the steering device 1.

In FIG. 2, the left side on the paper sheet corresponds to the front side of a vehicle body 2 to which the steering device 1 is mounted, the right side on the paper sheet corresponds to the rear side of the vehicle body 2, the upper side on the paper sheet corresponds to the upper side of the vehicle body 2, and the lower side on the paper sheet corresponds to the lower side of the vehicle body 2.

With reference to FIG. 2, the steering device 1 mainly includes a steering shaft 3, a column jacket 4, a lower bracket 5, an upper bracket 6, and a lock mechanism 7.

In the steering shaft 3, a steering member 8 is mounted to a first end 3A on the rear side, and a second end 3B on the front side is coupled to a steering mechanism 13 via a universal joint 9, an intermediate shaft 10, a universal joint 11, and a pinion shaft 12. The steering mechanism 13 is constituted by a rack and pinion mechanism and the like. The steering mechanism 13 steers a turning wheel such as a tire that is not shown in response to transmission of rotation of the steering shaft 3.

The steering shaft 3 has a substantially cylindrical or columnar shape that extends in a front-rear direction of the vehicle body 2 as a whole.

In the following description, the direction in which the steering shaft 3 extends is assumed to be an axial direction X. The axial direction X in the embodiment is inclined relative to a horizontal direction such that the second end 3B is lower than the first end 3A. The rear side as the first end side (the side where the steering member 8 is positioned) in the axial direction X is designated by a reference numeral "X1", while the front side as the second end side (the side opposite to the side where the steering member 8 is positioned) in the axial direction X is designated by a reference numeral "X2". The rear side X1 corresponds to the rear side of the vehicle body 2, and the front side X2 corresponds to the front side of the vehicle body 2.

Among directions orthogonal to the axial direction X, a direction perpendicular to the paper sheet in FIG. 2 is referred to as a right-left direction Y, and a direction extending substantially vertically in FIG. 2 is referred to as an up-down direction Z. In the right-left direction Y, the far side on the paper sheet in FIG. 2 is a right side Y1, and the near side on the paper sheet is a left side Y2. The upper side in the up-down direction Z is designated by a reference numeral "Z1", and the lower side in the up-down direction Z is designated by a reference numeral "Z2".

Note that, in each of the drawings other than FIG. 2, directions corresponding to the directions X to Z in FIG. 2 are designated by the same reference numerals as those in FIG. 2.

The steering shaft 3 includes a cylindrical or columnar upper shaft 14 and a cylindrical or columnar lower shaft 15. The upper shaft 14 is disposed on the rear side X1 of the lower shaft 15. The upper shaft 14 and the lower shaft 15 are concentrically arranged.

An end portion of the upper shaft 14 on the rear side X1 corresponds to the first end 3A of the steering shaft 3, and the steering member 8 is coupled to the end portion of the upper shaft 14 on the rear side X1. In the upper shaft 14, at least an end portion on the front side X2 is formed in a cylindrical shape. Into the end portion of the upper shaft 14 on the front side X2, an end portion of the lower shaft 15 on the rear side X1 is inserted from the front side X2.

The upper shaft 14 and the lower shaft 15 are fitted to each other by spline fitting or serration fitting. Accordingly, the upper shaft 14 and the lower shaft 15 can rotate together integrally, and can move relative to each other along the axial direction X. Therefore, the steering shaft 3 is telescopically adjustable (the steering shaft 3 can extend or contract) in the axial direction X.

The column jacket 4 is a hollow body that extends in the axial direction X as a whole. The steering shaft 3 is accommodated in the column jacket 4. The column jacket 4 has a substantially tubular upper jacket 16 and a substantially tubular lower jacket 17 that extend in the axial direction X.

The upper jacket 16 is positioned on the rear side X1 of the lower jacket 17. In other words, the lower jacket 17 is positioned on the front side X2 of the upper jacket 16. The lower jacket 17 is thicker than the upper jacket 16, and is fitted on the upper jacket 16. Specifically, an end portion 16A of the upper jacket 16 on the front side X2 is inserted into an end portion 17A of the lower jacket 17 on the rear side X1 from the rear side X1. In other words, the lower jacket 17 accommodates a part of the upper jacket 16. In this state, the upper jacket 16 can move relative to the lower jacket 17 in the axial direction X. With this relative movement, the column jacket 4 is telescopically adjustable in the axial direction X.

In addition, the steering shaft 3 is coupled to the column jacket 4 via a bearing that is not shown, and hence the column jacket 4 rotatably supports the steering shaft 3.

Specifically, the upper shaft 14 and the upper jacket 16 are coupled to each other via a bearing that is not shown. In addition, the lower shaft 15 and the lower jacket 17 are coupled to each other via a bearing that is not shown. Accordingly, the coupled body of the upper shaft 14 and the upper jacket 16 can move relative to the lower shaft 15 and the lower jacket 17 in the axial direction X. With this, the column jacket 4 is telescopically adjustable together with the steering shaft 3.

The positional adjustment of the steering member 8 in the axial direction X by extension or contraction of the steering shaft 3 and the column jacket 4 is called a telescopic adjustment.

The lower bracket 5 supports the portion of the column jacket 4 on the front side X2, and couples the steering device 1 to the vehicle body 2. Specifically, the lower bracket 5 supports the portion of the lower jacket 17 on the front side X2.

The lower bracket 5 includes a movable bracket 18 fixed to the lower jacket 17, a fixed bracket 19 fixed to the vehicle body 2, and a central shaft 20 extending in the right-left direction Y.

A pair of the right and left movable brackets 18 are provided on, e.g., an upper outer peripheral surface of an end portion 17B of the lower jacket 17 on the front side X2 (see FIG. 1). The movable bracket 18 is tiltably supported by the fixed bracket 19 via the central shaft 20. As a result, the entire column jacket 4 can tilt vertically about the central shaft 20 together with the steering shaft 3. An orientation adjustment of the steering member 8 by the tilt is called a tilt adjustment. The lower jacket 17 is coupled to the fixed bracket 19 fixed to the vehicle body 2 via the central shaft 20, and hence the lower jacket 17 can tilt but cannot move in the axial direction X.

The upper bracket 6 supports the portion of the column jacket 4 on the rear side X1 of the movable bracket 18. Specifically, the upper bracket 6 supports the portion of the lower jacket 17 on the rear side X1.

Figure 3:
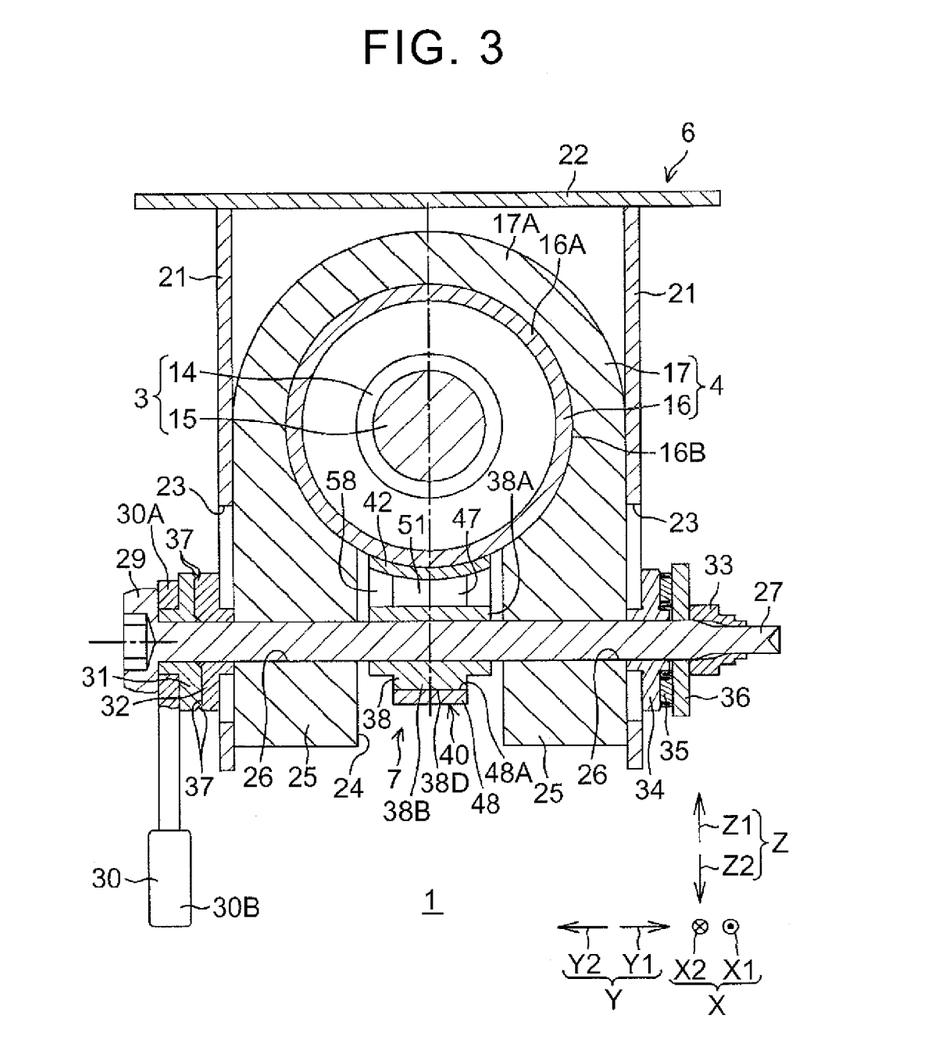
FIG. 3 is a schematic cross-sectional view of the steering device 1 taken along the line of FIG. 2.

FIG. 3 is a schematic cross-sectional view of the steering device 1 taken along the line III-III of FIG. 2.

With reference to FIG. 3, the upper bracket 6 has a groove shape that is opened downward, and is formed to be bilaterally symmetric with respect to the column jacket 4 so as to have a substantially U-shape that is vertically inverted when viewed from the axial direction X. Specifically, the upper bracket 6 integrally includes a pair of side plates 21 that oppose each other with the column jacket 4 interposed therebetween and a coupling plate 22 that is coupled to the upper end portions of the pair of the side plates 21. The side plate 21 is thin in the right-left direction Y, and the coupling plate 22 is thin in the up-down direction Z.

In the pair of the side plates 21, tilt elongated holes 23 are formed at the same positions when viewed from the right-left direction Y. The tilt elongated hole 23 extends in the up-down direction Z or, to be precise, in a tilt direction as a circumferential direction with the central shaft 20 (see FIG. 2) serving as the center. The coupling plate 22 has extending portions that extend outward in the right-left direction Y beyond the pair of the side plates 21, and the entire upper bracket 6 is fixed to the vehicle body 2 using bolts (not shown) or the like that are inserted into the extending portions.

Herein, in a portion on the lower side Z2 at the end portion 17A of the lower jacket 17 on the rear side X1, a slit 24 that extends in the axial direction X is formed (see also FIG. 1). A portion of the end portion 17A is removed by the slit 24. The slit 24 is opened to both of the rear side X1 and the lower side Z2 from the end portion 17A toward the outside of the lower jacket 17 (see also FIG. 1). Accordingly, the end portion 17A of the lower jacket 17 has a vertically inverted substantially U-shaped cross section.

In addition, at the end portion 17A of the lower jacket 17, a pair of support portions 25 that extend to the lower side Z2 while defining the slit 24 in the right and left direction Y is integrally provided. Each support portion 25 has a substantially rectangular solid shape that spreads in the axial direction X and the up-down direction Z.

In the pair of the support portions 25, through holes 26 that pass through the support portions 25 in the right-left direction Y are formed at the same positions when viewed from the right-left direction Y.

The steering device 1 includes a clamping shaft 27 that is inserted into a portion where the through hole 26 and the tilt elongated hole 23 overlap each other when viewed from the right-left direction Y. The clamping shaft 27 has a substantially columnar shape that extends in the right-left direction Y. Both ends of the clamping shaft 27 in the right-left direction Y protrude outward in the right-left direction Y from the pair of the side plates 21 of the upper bracket 6. At the end portion of the clamping shaft 27 on the left side Y2, a head portion 29 having a diameter larger than that of the clamping shaft 27 is formed.

In the steering device 1, between the head portion 29 and the side plate 21 on the left side Y2, a grippable lever-type operation member 30 that is operated for the telescopic adjustment and the tilt adjustment, an annular cam 31, and a cam follower 32 are arranged in this order from the left side Y2.

The clamping shaft 27 is inserted into a base end portion 30A of the operation member 30 on one end side in a longitudinal direction, the cam 31, and the cam follower 32. Since the clamping shaft 27 is inserted into each tilt elongated hole 23 of the upper bracket 6, the operation member 30, the cam 31, and the cam follower 32 are supported by the upper bracket 6 via the clamping shaft 27.

The operation member 30 and the cam 31 can rotate integrally with each other relative to the clamping shaft 27, while the cam follower 32 can rotate relative to the clamping shaft 27 and can move in the right-left direction Y. However, a portion of the cam follower 32 that is inserted into the tilt elongated hole 23 of the side plate 21 on the left side Y2 is formed with two opposing surfaces, and hence the slipping of the cam follower 32 is prevented by the tilt elongated hole 23.

To the end portion of the clamping shaft 27 on the right side Y1, a nut 33 is attached. Between the nut 33 and the side plate 21 on the right side, an interposed member 34, a needle roller bearing 35, and a thrust washer 36 are arranged in this order from the left side Y2. The clamping shaft 27 is inserted into the interposed member 34, the needle roller bearing 35, and the thrust washer 36.

The clamping shaft 27 can move in the above-described tilt direction in each tilt elongated hole 23 of the upper bracket 6. When a use such as a driver moves the steering member 8 in the up-down direction Z for the tilt adjustment, the entire column jacket 4 tilts relative to the upper bracket 6 as described above. The tilt adjustment of the steering member 8 is performed within a range in which the clamping shaft 27 can move in the tilt elongated hole 23.

When a user grips a tip portion 30B of the operation member 30 on one end side in the longitudinal direction and rotates the operation member 30 about the clamping shaft 27 in a first direction after the user performs the telescopic adjustment or the tilt adjustment, the cam 31 rotates, and cam protrusions 37 formed on the cam 31 and the cam follower 32 get on each other. With this, the cam follower 32 moves to the right side Y1 along the axial direction of the clamping shaft 27, and is pushed against the side plate 21 on the left side Y2. By the pushing, the pair of the side plates 21 are clamped from both sides in the right-left direction Y between the cam follower 32 and the interposed member 34.

With this, the pair of the side plates 21 holds the support portions 25 of the lower jacket 17 between them from both sides in the right-left direction Y, and a frictional force is thereby generated between each side plate 21 and the support portion 25. With the frictional force, the position of the column jacket 4 is locked, and the steering member 8 is locked at the position after the tilt adjustment and is prevented from moving in the tilt direction.

In addition, the pair of the support portions 25 of the lower jacket 17 is held between the side plates 21, and the distance between the pair of the support portions 25 is reduced so that the inner portion of the lower jacket 17 is narrowed, and the lower jacket 17 comes in pressure contact with the upper jacket 16 in the lower jacket 17.

With this, the frictional force is generated between the upper jacket 16 and the lower jacket 17, and the position of the upper jacket 16 is thereby locked, and the steering member 8 is thereby locked at the position after the telescopic adjustment and prevented from moving in the axial direction X.

Thus, the state of the steering device 1 when the position of the steering member 8 is fixed in each of the tilt direction and the axial direction X is called a "locked state".

In the steering device 1 in the locked state, when the operation member 30 is rotated in a second direction opposite to the first direction, the cam 31 rotates relative to the cam follower 32, and the cam follower 32 moves to the left side Y2 along the axial direction of the clamping shaft 27. Then clamping to the pair of the side plates 21 between the cam follower 32 and the interposed member 34 is released. As a result, the frictional force between each side plate 21 and the support portion 25 and the frictional force between the lower jacket 17 and the upper jacket 16 disappear, and hence the steering member 8 becomes capable of moving in the axial direction X and the tilt direction. With this, it becomes possible to perform the telescopic adjustment and the tilt adjustment of the steering member 8 again.

Thus, the state of the steering device 1 when the fixing of the position of the steering member 8 in the tilt direction and the axial direction X is released is called a "lock-released state".

Next, the lock mechanism 7 will be described in detail. The lock mechanism 7 is mechanism for firmly locking the upper jacket 16 such that the upper jacket 16 does not move in the axial direction X in the steering device 1 in the locked state. The lock mechanism 7 is accommodated in the slit 24 in the vicinity of the central portion of the clamping shaft 27 in the right-left direction Y.

Figure 4:
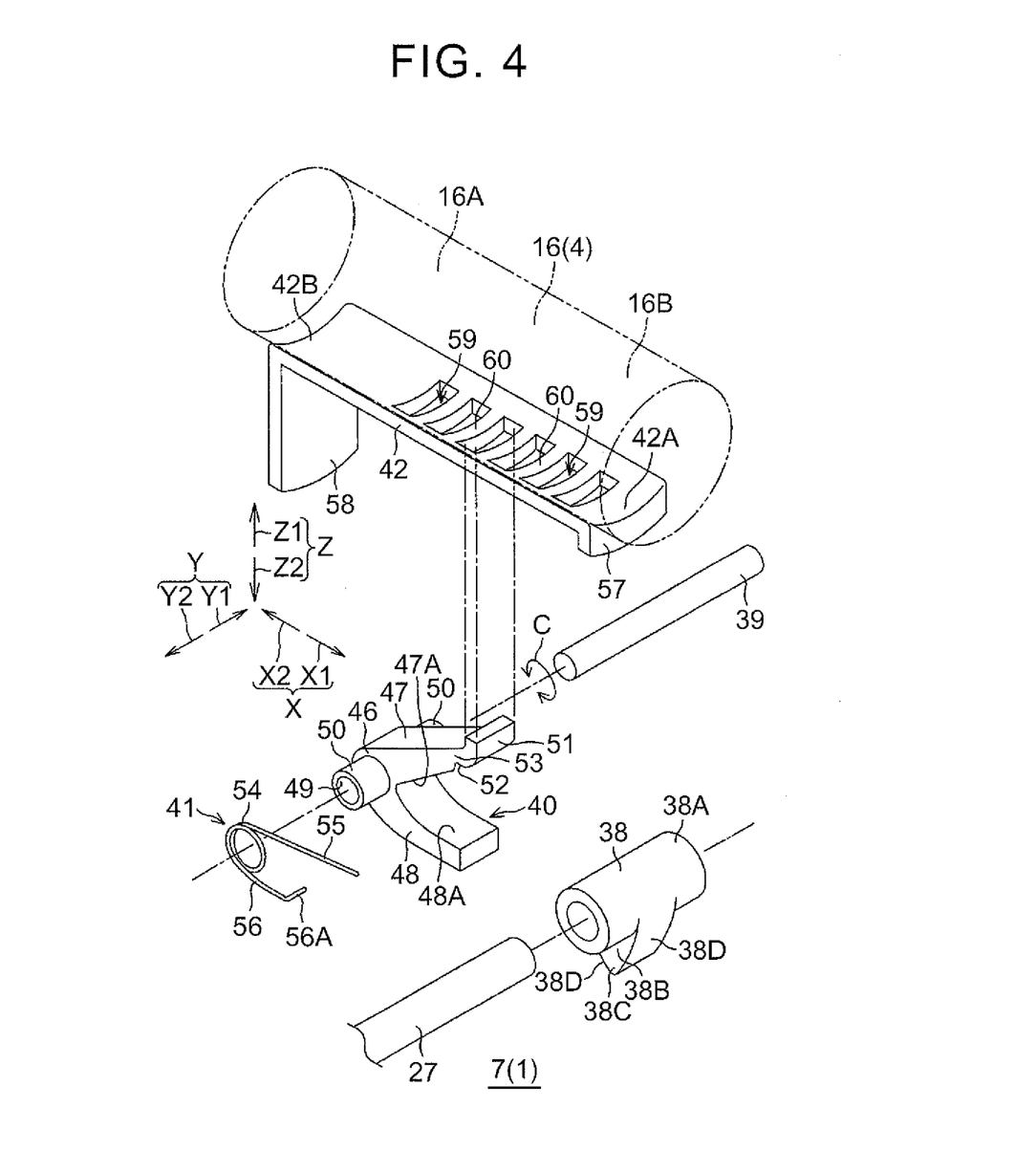
FIG. 4 is an exploded perspective view of the principal portion of the steering device 1.
Figure 5:
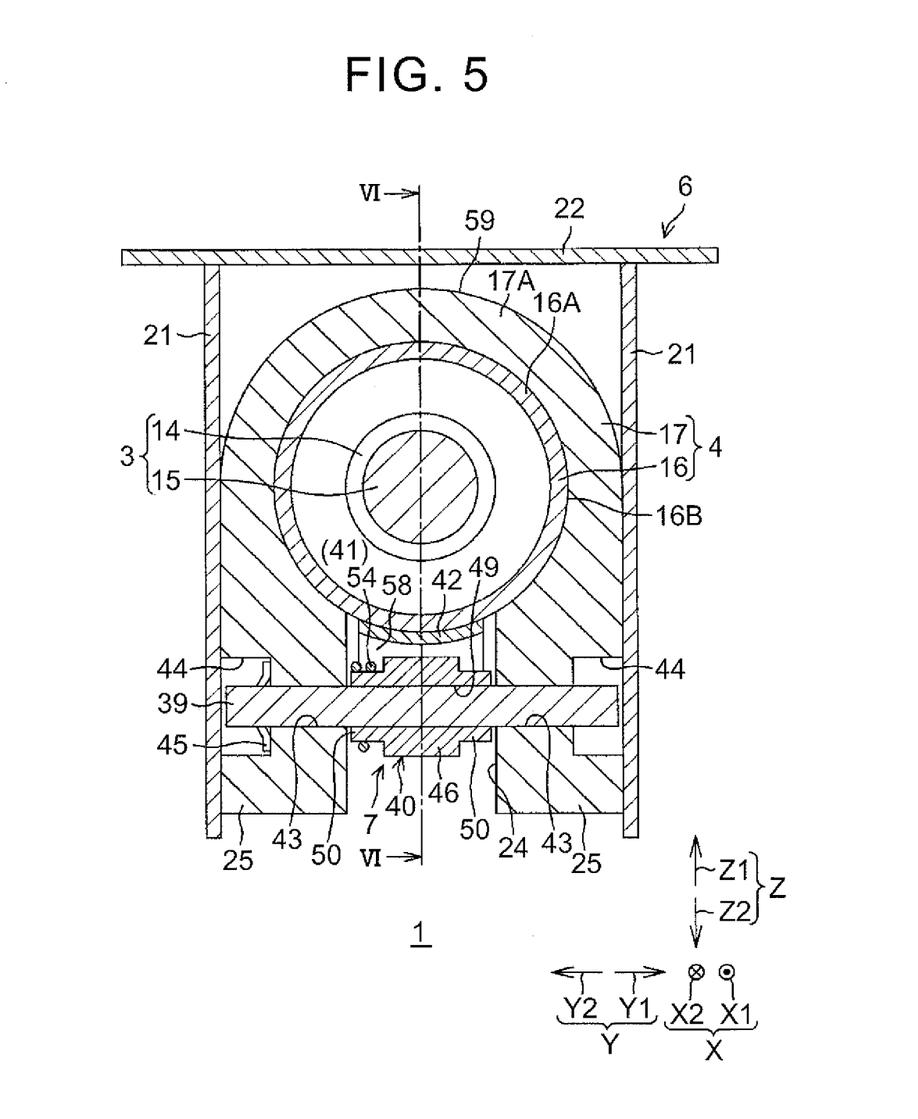
FIG. 5 is a schematic cross-sectional view of the steering device 1 taken along the line V-V of FIG. 2.
Figure 6:
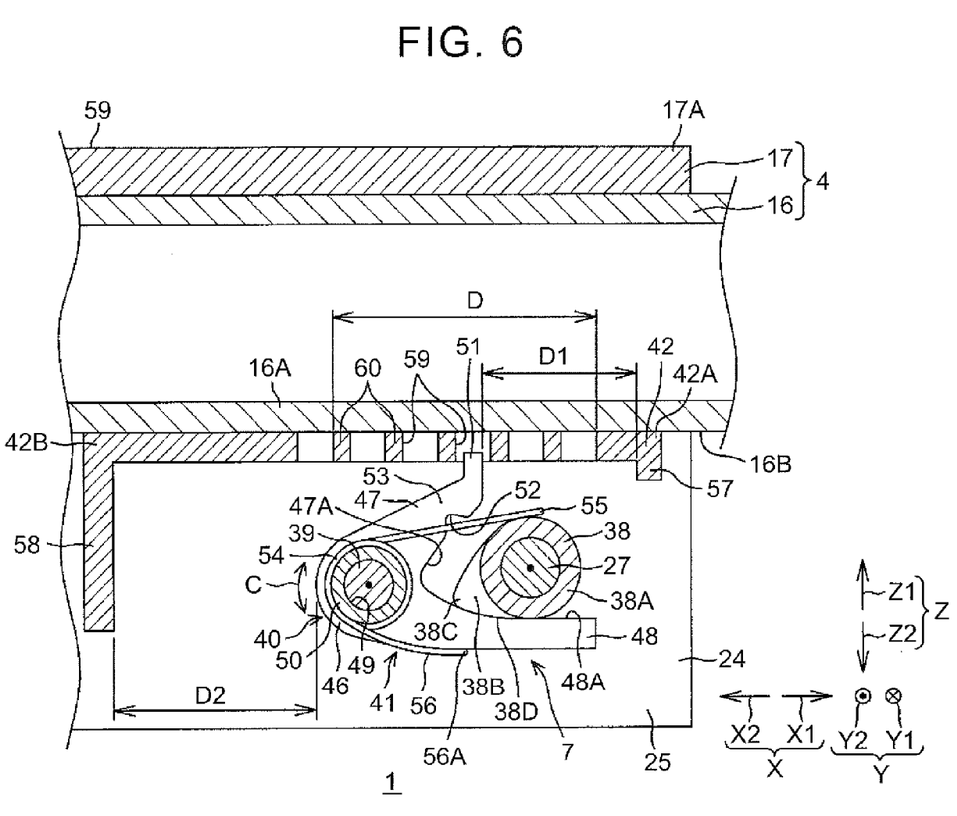
FIG. 6 is a schematic sectional view of the steering device 1 taken long the line VI-VI of FIG. 5.

FIG. 4 is an exploded perspective view of the principal portion of the steering device 1. In FIG. 4, for the convenience of description, the upper jacket 16 is represented by using a two-dot chain line. FIG. 5 is a schematic cross-sectional view of the steering device 1 taken along the line V-V of FIG. 2. FIG. 6 is a schematic sectional view of the steering device 1 taken long the line VI-VI of FIG. 5. In FIG. 6, for the convenience of description, the depiction of the steering shaft 3 is omitted (the same applies to FIG. 7 described later).

With reference to FIG. 4, the lock mechanism 7 includes a cam 38, a support shaft 39, a lock member 40, a biasing member 41, and a lock plate 42.

The cam 38 integrally includes a cylindrical boss portion 38A that extends in the right-left direction Y, and a cam portion 38B that protrudes outward in the radial direction of the boss portion 38A from one position on the periphery of the boss portion 38A. The cam portion 38B has a substantially triangular shape that is tapered with approach to the outside in the radial direction of the boss portion 38A when viewed from the right-left direction Y.

The outer tip portion of the cam portion 38B in the radial direction is designated by a reference numeral "38C". The cam portion 38B has a pair of arc-shaped surfaces 38D that connect the tip portion 38C and the outer peripheral surface of the boss portion 38A and are smoothly coupled to each other on the outer peripheral surface of the boss portion 38A.

The cam 38 is disposed in the slit 24 of the lower jacket 17, and the portion of the clamping shaft 27 exposed in the slit 24 between the pair of the support portions 25 is inserted into the boss portion 38A (see also FIG. 3). The boss portion 38A and the clamping shaft 27 are fitted to each other by spline fitting or the like. Accordingly, the cam 38 can rotate integrally with the clamping shaft 27 in accordance with the operation of the operation member 30. The cam 38 is supported by the lower jacket 17 via the clamping shaft 27.

The support shaft 39 is a substantially columnar shaft that extends in the right-left direction Y. With regard to the support shaft 39, with reference to FIG. 5, one through hole 43 that passes through the support portion 25 in the right-left direction Y is formed at the position on the front side X2 of the through hole 26 in each support portion 25 of the lower jacket 17. In each support portion 25, the through hole 43 has an increased diameter portion 44 of which the diameter is increased on the outside in the right-left direction Y. The support shaft 39 is inserted into the through hole 43 of each support portion 25, and can rotate in a circumferential direction C of the support shaft 39 (see FIG. 4). Therefore, a substantially center portion of the support shaft 39 is arranged in the slit 24.

Both end portions of the support shaft 39 in the right-left direction Y reach the increased diameter portions 44. A push nut 45 is attached to one of the end portions of the support shaft 39 in the right-left direction Y. In the embodiment, the push nut 45 is attached to the end portion of the support shaft 39 on the left side Y2. The support shaft 39 is positioned in the right-left direction Y by the push nut 45. Thus, the support shaft 39 is supported by the lower jacket 17 by being inserted into the through holes 43.

Returning to FIG. 4, the lock member 40 has a substantially V-shape that is inclined by about 90° to the rear side X1 when viewed from the right-left direction Y. The lock member 40 includes a base end portion 46, and a lock portion 47 and a contact portion 48 that extend from the base end portion 46 to the rear side X1.

The base end portion 46 is a coupling portion of the lock portion 47 and the contact portion 48. The base end portion 46 is formed with an insertion hole 49 that passes through the base end portion 46 in the right-left direction Y. On each of both side surfaces of the base end portion 46 in the right-left direction Y, a cylindrical portion 50 that protrudes outward in the right-left direction Y while surrounding the insertion hole 49 is formed. The cylindrical portion 50 is considered to be a part of the base end portion 46.

The lock portion 47 has a shape that extends from the base end portion 46 to the rear side X1 and the upper side Z1. The end portion of the lock portion 47 on the rear side X1 serves as a tooth 51, and the tooth 51 is bent toward the upper side Z1. In addition, a notch 52 that extends in the right-left direction Y is formed in a lower surface 47A of the lock portion 47. The notch 52 is adjacent to the front side X2 of the tooth 51.

The notch 52 is a groove that extends in the right-left direction Y. The portion of the lock portion 47 in which the notch 52 is formed is called a low-strength portion 53. The thickness of the lock portion 47 is locally reduced in the low-strength portion 53, and hence the strength in the low-strength portion 53 is lowered locally.

The contact portion 48 has a shape that extends from the base end portion 46 to the rear side X1. The contact portion 48 is positioned on the lower side Z2 of the lock portion 47.

The above-described lock member 40 is disposed on the front side X2 of the cam 38 in the slit 24 of the lower jacket 17

(see also FIG. 6). The portion of the support shaft 39 described above positioned in the slit 24 is inserted into the insertion hole 49 of the base end portion 46 of the lock member 40. The support shaft 39 and the base end portion 46 are fitted to each other by spline fitting or the like. Accordingly, the lock member 40 can rotate in the circumferential direction C about the shaft of the support shaft 39 together with the support shaft 39.

Moreover, since the support shaft 39 is inserted into the through hole 43 of each support portion 25 of the lower jacket 17 (see FIG. 5), the lock member 40 is supported by the lower jacket 17 via the support shaft 39.

In addition, the above-described cam 38 is disposed between the lock portion 47 and the contact portion 48 of the lock member 40, and the cam portion 38B of the cam 38 comes in contact with an upper surface 48A of the contact portion 48 from the upper side Z1 (see FIG. 6).

The biasing member 41 is a spring formed by bending a wire or the like. The biasing member 41 integrally includes a coil-shaped portion 54 that is wound around the outer peripheral surface of the cylindrical portion 50 of the base end portion 46 on the left side Y2 from the outside, and a holding portion 55 and a deformed portion 56 that extend from the coil-shaped portion 54 to the rear side X1. The deformed portion 56 is disposed on the lower side Z2 of the holding portion 55. An end portion 56A of the deformed portion 56 on the rear side X1 is bent to the right side Y1. The biasing member 41 is accommodated in the slit 24. The biasing member 41 is supported by the lower jacket 17 via the cylindrical portion 50 of the lock member 40.

In the biasing member 41, the holding portion 55 engages the outer peripheral surface of the portion of the boss portion 38A of the cam 38 on the left side Y2 of the cam portion 38B from the upper side Z1, and the end portion 56A of the deformed portion 56 engages the contact portion 48 of the lock member 40 from the lower side Z2 (see FIG. 6). In the biasing member 41, a force that moves the deformed portion 56 toward the holding portion 55 to the upper side Z1 is constantly generated, and this force serves as a biasing force for biasing the entire lock member 40 to the upper side Z1 along the circumferential direction C.

The lock plate 42 has a plate-like shape that is long in the axial direction X and is thick in the up-down direction Z, and is curved along an outer peripheral surface 16B of the upper jacket 16. At an end portion 42A of the lock plate 42 on the rear side X1 in the axial direction X, a bent portion as a first stopper 57 is formed. The first stopper 57 is bent toward the lower side Z2 (toward the lock mechanism 7). In addition, at an end portion 42B of the lock plate 42 on the front side X2 in the axial direction X, a bent portion as a second stopper 58 is formed. The second stopper 58 is bent toward the lower side Z2 (toward the lock mechanism 7). An end portion of the second stopper 58 on the lower side Z2 is positioned on the lower side Z2 of the first stopper 57.

The lock plate 42 is disposed at the portion of the underside of the outer peripheral surface 16B of the upper jacket 16 that is exposed to the slit 24 of the lower jacket 17 (see FIGS. 3 and 5). The lock plate 42 is accommodated in the notch 24 with small gaps formed between the lock plate 42 and the pair of the support portions 25, and is fixed to the upper jacket 16 by welding or the like. Accordingly, the lock plate 42 can move relative to the lower jacket 17 in the axial direction X together with the upper jacket 16. Since the small gaps are formed between the lock plate 42 and the pair of the support portions 25, the first stopper 57 and the second stopper 58 can move in the axial direction X together with the lock plate 42 in a state in which the first stopper 57 and the second stopper 58 are fitted in the slit 24.

In the lock plate 42, a plurality of holes 59 that extend along the circumferential direction of the outer peripheral surface 16B of the upper jacket 16 are formed so as to be arranged in the axial direction X. The number of holes 59 is six in the embodiment, but the number thereof is not limited thereto. Each hole 59 passes through the lock plate 42 in the up-down direction Z as the direction of thickness of the lock plate 42. Partition portions 60 are provided in the lock plate 42 so as to correspond to the plurality of the holes 59 on a one-to-one basis. The partition portion 60 is adjacent to the rear side X1 of the hole 59. Accordingly, the number of provided partition portions 60 is equal to the number of holes 59, and a plurality of the partition portions 60 are arranged in the axial direction X. The partition portion 60 other than the rearmost partition portion closest to the steering member 8 forms a boundary portion between two holes 59 adjacent to each other in the axial direction X.

The lock plate 42 is positioned on the upper side Z1 of (immediately above) the lock member 40. Accordingly, the lock member 40 (the tooth 51) that is biased to the upper side Z1 by the biasing member 41 is biased toward the lock plate 42.

In the above-described locked state shown in FIG. 6, the cam portion 38B of the cam 38 is directed to the front side X2, and the arc-shaped surface 38D of the cam portion 38B on the lower side Z2 comes in surface contact with the upper surface 48A of the contact portion 48 of the lock member 40 from the upper side Z1.

In the locked state, the tooth 51 of the lock portion 47 in the lock member 40 is normally fitted in and engaged with any of the holes 59 in the lock plate 42 in a state in which the tooth 51 has entered the hole 59 of the lock plate 42 from the lower side Z2. The position of the tooth 51 when the tooth 51 has entered the hole of the lock plate 42 are called "advance positions". In a state in which the tooth 51 is at the advance position, individual members constituting the lock mechanism 7 are accommodated in the slit 24.

The biasing member 41 biases the entire lock member 40 to the upper side Z1, as described above. With this, the tooth 51 is kept engaged with the hole 59 of the lock plate 42. That is, in the locked state, the tooth 51 is biased so as to be constantly positioned at the advance position.

In the state in which the tooth 51 is at the advance position and is engaged with any hole 59 in the lock plate 42 in the locked state, the tooth 51 engaged with the hole 59 is sandwiched between the partition portions 60 on both sides in the axial direction X. Accordingly, the movement of the lock plate 42 in the axial direction X is prevented by the lock member 40. In this connection, in the case where the tooth 51 is engaged with the frontmost hole 59, the tooth 51 is sandwiched between the frontmost partition portion 60 and a front end portion 42B of the lock plate 42 that defines the hole 59 from the front side X2.

In addition, as described above, the lock plate 42 is fixed to the upper jacket 16, and the lock member 40 is fixed to the lower jacket 17 via the support shaft 39. Accordingly, when the tooth 51 is at the advance position in the locked state, the movement of the upper jacket 16 relative to the lower jacket 17 in the axial direction X is prevented.

With this, in addition to the frictional force between the lower jacket 17 and the upper jacket 16, the tooth 51 fixed to the side of the lower jacket 17 is engaged with the hole 59 of the lock plate 42 fixed to the upper jacket 16, and it is thereby possible to firmly lock the position of the upper jacket 16 in the axial direction X. Accordingly, the extension and contraction of the steering shaft 3 and the column jacket 4 are stopped and the position of the steering member 8 in the axial direction X is locked, and hence the telescopic adjustment is prevented from being performed.

As shown in FIG. 6, in the case where the steering device 1 is in the locked state and the tooth 51 is at the advance position, a vehicle having the steering device 1 and the vehicle body 2 can perform normal running.

At the time of a vehicle collision, a collision load from the rear side X1 caused by what is called a secondary collision acts on the steering shaft 3 and the column jacket 4. At this point, the upper jacket 16 and the upper shaft 14 starts to contract, whereby the load from the rear side X1 acts on the tooth 51 engaged with the hole 59 of the lock plate 42. With this, the lock portion 47 of the lock member 40 is broken at the low-strength portion 53.

With this, the tooth 51 engaged with the hole 59 of the lock plate 42 in the lock portion 47 is separated from the portion of the lock portion 47 other than the tooth 51 at the low-strength portion 53. As a result, the upper jacket 16 to which the lock plate 42 is fixed moves relative to the fixed lower jacket 17 such that the column jacket contracts. With this relative movement, it is possible to absorb energy at the time of the vehicle collision (at the time of the secondary collision).

Figure 7:
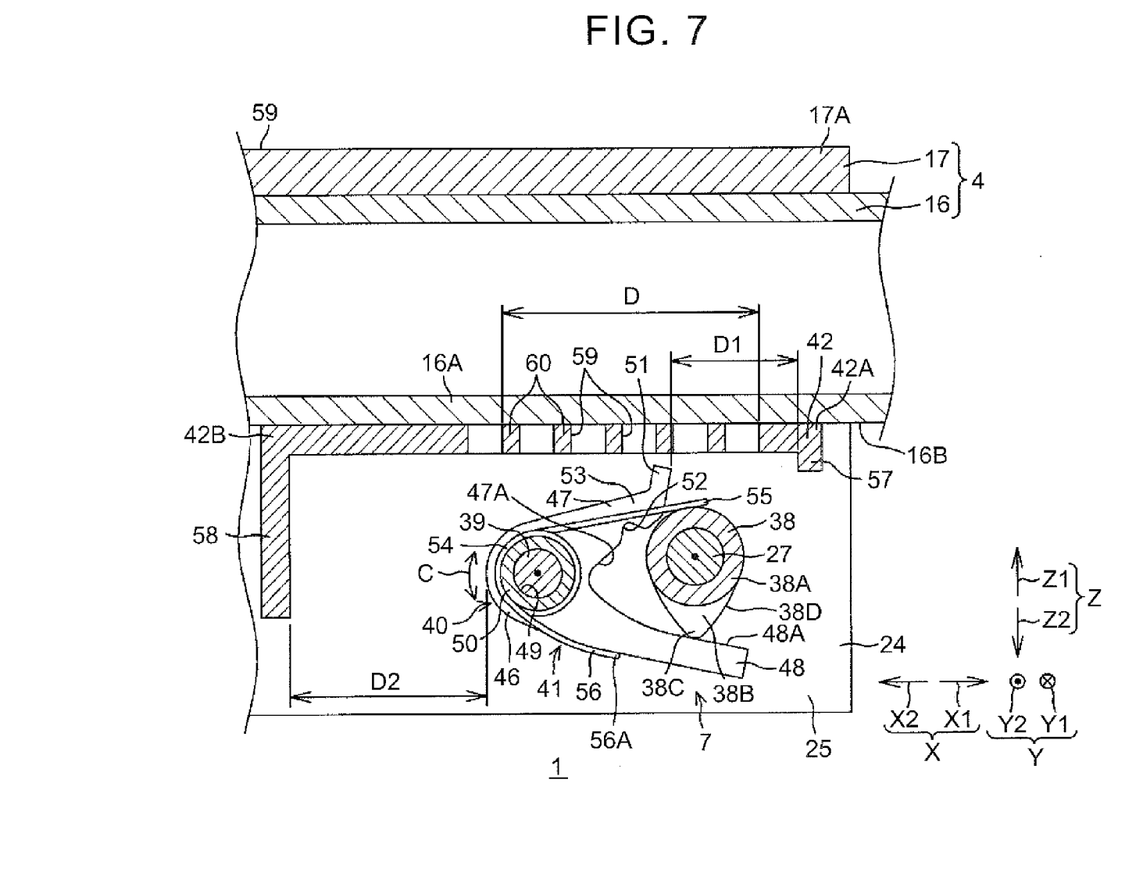
FIG. 7 is a view showing a state in which a tooth 51 retreats from a hole 59 in the steering device shown in FIG. 6.

FIG. 7 is a view showing a state in which the tooth 51 has retreated from the hole 59 in the steering device 1 shown in FIG. 6.

In the state in FIG. 6, the clamping shaft 27 is rotated by operating the operation member 30 such that the steering device 1 is switched from the locked state to the lock-released state. Then the cam 38 rotates integrally with the clamping shaft 27 counterclockwise when viewed from the left side Y2 such that the cam portion 38B that has been directed to the front side X2 is directed to the lower side Z2. With the rotation of the cam 38, the cam portion 38B pushes down the contact portion 48 of the lock member 40 to the lower side Z2.

With this, the entire lock member 40 rotates about the support shaft 39 to the lower side Z2 against the biasing force of the biasing member 41. With this, the tooth 51 of the lock member 40 starts to retreat from the lock plate 42 to the lower side Z2, and be disengaged from the hole 59 of the lock plate 42 with which the tooth 51 has been engaged and.

As shown in FIG. 7, when the steering device 1 is brought into the lock-released state, the cam portion 38B is directed to the lower side Z2, and the lock member 40 is fully rotated to the lower side Z2. At this point, the tooth 51 of the lock member 40 completely retreats from the lock plate 42 to the lower side Z2, and is completely disengaged from the hole 59 of the lock plate 42 with which the tooth 51 has been engaged. Thus, the position of the tooth 51 that have retreated from the lock plate 42 is called a "retreat position". Individual members constituting the lock mechanism 7 are accommodated in the slit 24 even in a state in which the tooth 51 is at the retreat position.

Note that, at the retreat position, the end portion of the tooth 51 on the upper side Z1 is positioned on the upper side Z1 of the end portion of the first stopper 59 of the lock plate 42 on the lower side Z2. In addition, the end portion of the cam 38 on the upper side Z1 is positioned on the lower side Z2 of the end portion of the first stopper 59 of the lock plate 42 on the lower side Z2.

Further, in the state in which the tooth 51 is at the retreat position, the end portion of the second stopper 58 on the lower side Z2 is positioned on the lower side Z2 of the end portion of the lock member 40 on the front side X2.

Similarly to the locked state, in the lock-released state as well, the biasing member 41 biases the entire lock member 40 to the upper side Z1. In addition, the cam portion 38B of the cam 38 comes in contact with the contact portion 48 of the lock member 40 from the upper side Z1. Accordingly, the tooth 51 of the lock member 40 is biased toward the advance position (toward the lock plate 42) by the biasing member 41, but the tooth 51 is positioned at the retreat position in the lock-released state.

In the state in which the tooth 51 is at the retreat position, the prevention of the movement of the lock plate 42 in the axial direction X by the lock member 40 is released. As a result, the upper jacket 16 can freely move relative to the lower jacket 17 in the axial direction X with the lock plate 42, and hence it becomes possible to cause the steering shaft 3 and the column jacket 4 to extend or contract to thereby perform the telescopic adjustment of the steering member 8. When the telescopic adjustment is performed, the individual holes 59 of the lock plate 42 sequentially pass on the upper side Z1 of the tooth 51 at the retreat position along the axial direction X. In addition, in this state, it is also possible to perform the tilt adjustment.

In addition, in the telescopic adjustment, the lock plate 42 as an element constituting the lock mechanism 7 is always accommodated in the slit 24. Further, as described above, the second stopper 58 is fitted in the slit 24 in the state in which the lock plate 42 is accommodated in the slit 24. Therefore, in the telescopic adjustment and the tilt adjustment, the second stopper 58 as a part of the lock plate 42 is maintained in the state in which the second stopper 58 is fitted in the slit 24.

With this, the second stopper 58 functions as a rotation stopper, and it is possible to prevent unexpected relative rotation between the upper jacket 16 and the lower jacket 17.

With reference to FIG. 7, in the telescopic adjustment, when the steering member 8 is moved in the axial direction X, the upper jacket 16 moves relative to the lower jacket 17 in the axial direction X. A distance corresponding to the maximum movement amount of the upper jacket 16 in the telescopic adjustment of the steering member 8 is designated by a reference mark "D". The distance D corresponds to a distance between the end surface of the partition portion 60 on the front side X2 adjacent to the rear side X1 of the rearmost hole 59 in the lock plate 42 and the end surface of the partition portion 60 on the front side X2 adjacent to the rear side X1 of the frontmost hole 59 in the lock plate 42.

In the telescopic adjustment, when the steering member 8 is moved to the front side X2, the upper jacket 16 moves relative to the lower jacket 17 to the front side X2. With the relative movement of the upper jacket 16, the first stopper 57 of the lock plate 42 moves to the front side X2.

Herein, as described above, at the retreat position, the end portion of the first stopper 57 of the lock plate 42 on the lower side Z2 is positioned on the lower side Z2 of the end portion of the tooth 51 on the upper side Z1. When the first stopper 57 has moves a distance D1 in the axial direction X between the tooth 51 and the first stopper 57, the first stopper 57 abuts on the tooth 51 of the lock member 40 from the rear side X1. Therefore, the movement of the upper jacket 16 relative to the lower jacket 17 to the front side X2 in the telescopic adjustment is restricted by the first stopper 57.

Therefore, by adjusting the position of the first stopper 57, i.e., the position of the end portion 42A of the lock plate 42 in the axial direction X, it is possible to adjust the movement amount of the upper jacket 16 relative to the lower jacket 17.

Note that the strength of the low-strength portion 53 is set such that the lock member 40 is not broken by the abutment. In addition, as described above, the end portion of the cam 38 on the upper side Z1 is positioned on the lower side Z2 of the end portion of the lock plate 42 on the lower side Z2. Accordingly, the first stopper 57 can move the distance D1 without abutting on the cam 38.

In the telescopic adjustment, when the steering member 8 is moved to the rear side X1, the upper jacket 16 moves relative to the lower jacket 17 to the rear side X1. With the relative movement of the upper jacket 16, the second stopper 58 of the lock plate 42 moves to the rear side X1.

Herein, as described above, the end portion of the second stopper 58 on the lower side Z2 is positioned on the lower side Z2 of the end portion of the lock member 40 on the front side X2. Accordingly, when the second stopper 58 has moved a distance D2 between the second stopper 58 and the end portion of the lock member 40 on the front side X2, the second stopper 58 abuts on the end portion of the lock member 40 on the front side X2 from the front side X2. Therefore, the movement of the upper jacket 16 relative to the lower jacket 17 to the rear side X1 in the telescopic adjustment is restricted by the second stopper 58.

With this, in the telescopic adjustment, it is possible to prevent the upper jacket 16 from being detached from the lower jacket 17 to the rear side X1 unexpectedly.

In addition, also by adjusting the position of the second stopper 58, i.e., the position of the end portion 42B of the lock plate 42 in the axial direction X, it is possible to adjust the movement amount of the upper jacket 16 relative to the lower jacket 17 to the rear side X1.

As described thus far, in the telescopic adjustment, the first stopper 57 and the second stopper 58 prevent the movement of the upper jacket 16 relative to the lower jacket 17 in the axial direction X by abutting on the lock mechanism 7 in the axial direction X.

In addition, as described above, the first stopper 57 and the second stopper 58 are formed by bending the end portions 42A and 42B of the lock plate 42 in the axial direction X.

Consequently, it is possible to form the first stopper 57 and the second stopper 58 as a part of the lock plate 42 simultaneously in the step of forming the lock plate 42. That is, in the assembly of the steering device 1, it is not necessary to provide a new step for forming the first stopper 57 and the second stopper 58. It is not necessary to provide the first stopper 57 and the second stopper 58 as independent components so that it is possible to achieve a reduction in the number of components. In addition, working for fixing the first stopper 57 and the second stopper 58 to the upper jacket 16 such as welding or screw fastening is not required, and hence it is possible to achieve a reduction in the assembly cost of the first stopper 57 and the second stopper 58. Consequently, it is possible to achieve a reduction in the number of assembly steps.

Further, when compared with a configuration in which an elongated hole for insertion of the first stopper 57 and the second stopper 58 is provided in the lower jacket 17 and the movement of the upper jacket 16 is restricted by abutment of the first stopper 57 and the second stopper 58 on the peripheral edge portion of the hole, it is not necessary to provide the elongated hole in the lower jacket 17, and hence it is possible to prevent a reduction in the stiffness of the steering device 1.

As the result of the foregoing, it is possible to prevent a reduction in stiffness while achieving a reduction in the number of assembly steps.

After the telescopic adjustment or the tilt adjustment of the steering member 8, as shown in FIG. 6, the operation member 30 is operated again, and the steering device 1 is brought into the locked state and the tooth 51 is moved to the locked position. Then the positions of the upper jacket 16 in the axial direction X and the tilt direction are locked. Thus, the tooth 51 can be advance to or retreat from the lock plate 42 in accordance with the operation of the operation member 30, and is engaged with any of the holes 59 in the lock plate 42 in the state in which the tooth 51 advances to the lock plate 42 at the advance position.

Note that the second stopper 58 is not broken after the secondary collision, and the lock member 40 remains. Accordingly, in the case where the upper jacket 16 is moved relative to the lower jacket 17 to the rear side X1 after the secondary collision, the second stopper 58 abuts on the end portion of the lock member 40 on the front side X2. With this, also after the secondary collision, it is possible to prevent the upper jacket 16 from being detached from the lower jacket 17 to the rear side X1 unexpectedly.

The invention is not limited to the embodiment described above, and various changes can be made within the scope of the claims.

For example, in the embodiment described above, the tooth 51 is constantly biased so as to advance toward the lock plate 42 by the biasing member 41, and retreats by receiving the force of the cam 38 that rotates by the operation of the operation member 30. That is, the tooth 51 and the clamping shaft 27 of the operation member 30 are different components that are independent of each other, and are linked with each other via the cam 38. Instead of this configuration, the tooth 51 may be integrated with the clamping shaft 27, and the tooth 51 may be caused to advance or retreat in response to the operation of the operation member 30 without the intervention of the cam 38.

In addition, the invention can also be applied to the steering device capable of only the telescopic adjustment.

What is claimed is:

1. A steering device comprising:
   a steering shaft including a first end to which a steering member is mounted and second end, wherein the steering shaft is telescopically adjustable in an axial direction of the steering shaft;
   a column jacket rotatably supporting the steering shaft and including an upper jacket positioned on a first end side and a lower jacket positioned on a second end side, wherein the column jacket is telescopically adjustable with movement of the upper jacket relative to the lower jacket in the axial direction;
   a lock plate fixed to the upper jacket and provided with a plurality of holes arranged in the axial direction; and
   a lock mechanism supported by the lower jacket and including a tooth that advances to and retreats from the lock plate, wherein:
   the lock mechanism moves the tooth such that the tooth advances to the lock plate to be engaged with one of the holes, and retreats from the lock plate to be disengaged from the one of the holes;
   the lock plate includes a bent portion as a stopper at an end portion of the lock plate in the axial direction; and
   the stopper restricts the movement of the upper jacket relative to the lower jacket in the axial direction by abutting on the lock mechanism in the axial direction when the steering shaft and the column jacket is telescopically adjusted.

2. The steering device according to claim 1, wherein the stopper is bent toward the lock mechanism.

3. The steering device according to claim 1, wherein the stopper includes a first stopper provided at an end portion of the lock plate in the axial direction on the first end side.

4. The steering device according to claim 3, wherein an end portion of the tooth on an upper side is positioned on the upper side of an end portion of the first stopper on a lower side in a state in which the tooth retreats from the lock plate to a lower side of the lock plate.

5. The steering device according to claim 1, wherein the stopper includes a second stopper provided at an end portion of the lock plate in the axial direction on the second end side.

6. The steering device according to claim 5, wherein an end portion of the second stopper on an lower side is positioned on the lower side of an end portion of the lock mechanism on the second end side in a state in which the tooth retreats from the lock plate to the lower side of the lock plate.

7. The steering device according to claim 1, wherein:
the lower jacket is a tubular body provided with a slit that extends in the axial direction and accommodates the lock mechanism;
the upper jacket is accommodated in the lower jacket; and
the stopper is fitted in the slit.

* * * * *